Patented Jan. 16, 1951

2,538,595

UNITED STATES PATENT OFFICE 2,538,595

DRESSING SEED COMPOSITION

Frederick Lawrence Sharp, Blackley, Manchester, England, assignor to Imperial Chemical Industries Limited, a corporation of Great Britain No Drawing. Application December 9, 1947, Serial No. 790,701. In Great Britain December 11, 1946

5 Claims. (Cl. 167—38)

This invention relates to new seed dressing compositions and to their application.

It is known to treat seed with organic mercurial seed disinfectants for protection against seed-borne diseases, and it is also known to apply the gamma isomer of benzene hexachloride (Berichte der deutschen chemischen Gesellschaft, 45, 236, 1912) to soil for the protection of plants against wireworms.

We have now found that gamma benzene hexachloride can be applied along with the organic mercurial seed disinfectants in dry pulverulent seed dressing compositions, so as to effect both protections at once.

It was not to be expected that protection of the germinating and growing plant against wireworms could be effected by the application of gamma benzene hexachloride to the seed as a dressing, especially bearing in mind the very small quantities that can be applied in this way, since the wireworms are not associated with the seed as are the spores which are responsible for the seed-borne diseases.

By working according to our invention, economy is effected in the use of gamma benzene hexachloride and the need for a separate treatment for protection against wireworms is eliminated. In dressing wheat seed, protection against wireworms has been obtained by the use of gamma benzene hexachloride corresponding to only half an ounce per acre.

In some cases we find that the seed dressings also enhance growth. Protection may also be given against soil pests other than wireworms, where these pests are present in sufficient numbers to be harmful.

In preparing the new seed dressing compositions, proportions of gamma benzene hexachloride as low as 5–10% have already been found to be effective in some trials. In other respects, e. g. in the proportions of the organic mercurial seed disinfectants, in the nature of the inert diluents and in the use, if desired, of anti-dusting agents, the seed dressing compositions may correspond to organic mercurial seed dressing compositions. The new seed dressing compositions can also be applied in the same ways as the old, and in the same proportions, e. g. 2 ounces per bushel of seed in the case of wheat, i. e. about 0.2% by weight.

In making the compositions it is not essential to use gamma benzene hexachloride in chemically pure form.

The following examples in which parts are by weight illustrate but do not limit the invention.

*Example 1*

The following components are intimately blended together:

15 parts of gamma benzene hexachloride
2 parts of phenylmercuriacetate
3 parts of mineral oil and
80 parts of china clay This seed dressing is applied to oat seed in a suitable seed dresser at the rate of 2½ ounces per bushel. The so treated seed is then sown and will be found to germinate and develop satisfactorily even where the soil contains a high wireworm population and the oat seed was infected with leaf stripe (*Helminthosporium avenae*).

*Example 2*

The following components are well mixed together:

20 parts of gamma benzene hexachloride
1.5 parts of ethylmercuriphosphate
3 parts of mineral oil
75.5 parts of china clay The resulting seed dressing is applied to wheat seed in a suitable seed dressing machine at the rate of 2 ounces per bushel, i. e. about 0.2% by weight.

The dressed seed on sowing will eventually give satisfactory yields of grain despite the presence of seed borne disease, e. g. bunt spores (*Tilletia caries*) on the seed and wireworms and any other harmful pests in the soil.

*Example 3*

The following components are intimately blended together:

15 parts of gamma benzene hexachloride
1 part of phenylmercuriacetate
0.5 part of ethylmercurichloride
2 parts of mineral oil
81.5 parts of finely ground talc This mixture is applied to grass seed at the rate of 2 ounces per bushel, i. e. about 0.6% by weight, and on sowing gives greatly improved plant establishment, through the control of seed borne diseases and soil pests.

*Example 4*

The following components are intimately blended together:

60 parts of gamma benzene hexachloride
6 parts of phenylmercuriacetate
2 parts of mineral oil
30 parts of china clay The above dressing is applied to wheat at the rate of ½ ounce per bushel, i. e. about 0.05% by weight, to control the effect of bunt (*Tilletia caries*) and of wireworms and other soil pests.

I claim:

1. Dry pulverulent seed dressing compositions comprising gamma benzene hexachloride and an organic mercurial seed disinfectant.

2. Dry pulverulent seed dressing compositions comprising gamma benzene hexachloride, an organic mercurial seed disinfectant, and a dry pulverulent inert diluent.

3. Dry pulverulent seed dressing compositions comprising gamma benzene hexachloride, an organic mercurial seed disinfectant and an anti-dusting agent, mineral oil.

4. Dry pulverulent seed dressing compositions comprising gamma benzene hexachloride, an organic mercurial seed disinfectant, a dry pulverulent inert diluent and an anti-dusting agent, mineral oil.

5. A dry pulverulent seed dressing composition comprising 15-60 parts by weight of gamma benzene hexachloride, 1.5-2 parts by weight of an organic mercurial seed disinfectant, 2-3 parts by weight of mineral oil, and 30-81.5 parts by weight of a dry pulverulent inert diluent.

FREDERICK LAWRENCE SHARP.

REFERENCES CITED

The following references are of record in the file of this patent:

UNITED STATES PATENTS

| Number | Name | Date |
| --- | --- | --- |
| 1,770,886 | Kharasch | July 15, 1930 |
| 1,780,008 | Engelmann | Oct. 28, 1930 |
| 1,919,936 | Engelmann | July 25, 1933 |
| 1,920,009 | Engelmann | July 25, 1933 |
| 1,947,926 | Steindorff | Feb. 20, 1934 |
| 1,969,857 | Shepss | Aug. 14, 1934 |
| 2,109,143 | Wolff | Feb. 22, 1938 |

FOREIGN PATENTS

| Number | Country | Date |
| --- | --- | --- |
| 586,691 | Great Britain | Mar. 27, 1947 |
| 582,042 | Great Britain | of 1946 |